(12) United States Patent
Tamura et al.

(10) Patent No.: US 6,480,240 B1
(45) Date of Patent: Nov. 12, 2002

(54) TELEVISION SYSTEM HAVING A COLOR COMPONENT ADJUSTING MEANS

(75) Inventors: Yoshikuni Tamura, Shijonawate (JP); Munetoshi Kajiya, Daito (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/367,835

(22) PCT Filed: Mar. 2, 1998

(86) PCT No.: PCT/JP98/00870

§ 371 (c)(1),
(2), (4) Date: Aug. 25, 1999

(87) PCT Pub. No.: WO98/39926

PCT Pub. Date: Sep. 11, 1998

(30) Foreign Application Priority Data

Mar. 4, 1997 (JP) ............................................... 9-048793

(51) Int. Cl.[7] ................................................. K04N 9/73
(52) U.S. Cl. ........................ 348/659; 348/734; 348/649
(58) Field of Search ................................ 348/734, 649, 348/659, 656, 569, 553

(56) References Cited

U.S. PATENT DOCUMENTS

| | | | | |
|---|---|---|---|---|
| 4,989,081 A | * | 1/1991 | Miyagawa et al. | 348/734 |
| 5,434,626 A | * | 7/1995 | Hayashi et al. | 348/569 |
| 5,774,187 A | * | 6/1998 | Isunoda | 348/553 |

FOREIGN PATENT DOCUMENTS

| | | |
|---|---|---|
| JP | 53-140929 | 12/1978 |
| JP | 60-47584 | 3/1985 |
| JP | 2-120979 | 10/1990 |
| JP | 3-238994 | 10/1991 |
| JP | 4-91486 | 8/1992 |
| JP | 4-307890 | 10/1992 |
| JP | 4-326891 | 11/1992 |
| JP | 5-113802 | 5/1993 |
| JP | 5-85182 | 11/1993 |
| JP | 6-121331 | 4/1994 |
| JP | 7-284120 | 10/1995 |
| JP | 8-265792 | 10/1996 |

* cited by examiner

*Primary Examiner*—Victor R. Kostak
(74) *Attorney, Agent, or Firm*—Arent Fox Kintner Plotkin & Kahn, PLLC

(57) ABSTRACT

A television system includes a television receiver (11) and a remote control (18, 72). If an RGB bias level adjusting mode is set by the remote control, the CPU (74) disables the ramp waveform generator (36) but enables a brightness component cutoff circuit (58a) and color component cutoff circuit (58b) that are included in an YC mixing circuit (58). In response, vertical deflection is suspended, and a video signal having a pedestal level is outputted onto a display (70). Accordingly, luminescence occurs on the display at a vertically center thereof. Meanwhile, the bias level is adjusted optimal by user's operation of a numeral key provided on the remote control while observing on the display.

7 Claims, 11 Drawing Sheets

(A)

(B)

(C)

70

TELEVISION SYSTEM HAVING A COLOR COMPONENT ADJUSTING MEANS

TECHNICAL FIELD

This invention relates to television systems and, more specifically, to a television system which is provided for example with a main body (television receiver) and remote control.

PRIOR ART

When adjusting R, G and B bias levels in the process of manufacturing a television receiver, vertical deflection is first suspended. At this time, a horizontally-lined state as shown in FIG. 11 is brought about on the display 1, wherein a lightly whitish image is outputted only horizontally at a vertically centered position thereof. This image is captured by a camera 2 so that the image is measured in color temperature by a personal computer 3. In accordance with the measured color temperature, the CPU 4 delivers a control signal to a DC level control circuit 5, thereby adjusting R, G and B bias levels. Meanwhile, when adjustment is performed on white balance, an all-white image is outputted onto the display 1. The image is measured of color temperature by the personal computer 3. In accordance with the measured color temperature, the CPU performs adjustments on R and B gains of an RGB drive amplifier 6.

In the manufacturing process, almost no especial problem is encountered in the above method adjustment. However, where re-adjustment is made for the bias level or gain on a completed television receiver at a shipment destination, a camera 2 and personal computer 3 must be prepared. This results in increase in labor and time required for adjustment.

SUMMARY OF THE INVENTION

It is therefore a primary object of the present invention to provide a novel television system.

It is another object of the present invention to provide a television system which can be adjusted of R, G and B bias levels without encountering difficulty.

It is still another object of the present invention to provide a television system which can be adjusted of white balance without encountering difficulty.

A television system according to the present invention includes a remote control and a television receiver that receives a key operation signal supplied from the remote control, which comprises: a mode set means for setting the television receiver in an adjustment mode; and a color component adjust means for adjusting, in a color component adjusting mode, a color component according to a key operation signal given from the remote control.

The color component includes an RGB bias level and/or RGB gain. When the mode set means sets a bias adjusting mode, the bias level adjust means included in the color component adjusting means adjusts an RGB bias level according to a key operation signal given from the remote control. When the mode set means sets a gain adjusting mode, the gain level adjust means included in the color component adjusting means adjusts at least two of R gain, G gain and B gain according to a key operation signal given from the remote control.

That is, if an R, G or B bias level adjusting mode is entered, brightness and color component for example in the video signal are cut down to set the bright level to a reference value. Also, the vertical deflection is suspended. Consequently, the display is brought into a horizontally-lined state wherein a lightly whitish image is outputted horizontally at a vertical center position thereof. On the other hand, a channel select key provided on the remote control is set, for example, as a bias level adjusting key. Due to this, if an operator operates the same channel select key, the CPU adjust, for example, a bias level in response thereto. The image outputted horizontally-lined on the display is reddish, operator's operation of the channel select key "1" decreases an R bias level, thus making the output image white. Meanwhile, if the image is bluish, operator's operation of the channel select key "7" decreases a B bias level, thus making the output image whitish.

If a gain adjusting mode is entered in a state that a test signal is inputted from an outside, the channel select key of the remote control is set as an R and B gain adjusting key. Consequently, the R or B gain is adjusted by operator's operation of the same channel select key. Although an all-white image is outputted on the display according to the test signal inputted from the outside, the output image if large in R gain becomes reddish. Consequently, operator's operation, for example, of the channel select key "1" decreases the R gain and hence improves redness.

According to the present invention, color components, e.g. an RGB bias level and/or RGB gain, can be adjusted by operator's operation of a remote-control predetermined key set as an adjust key while visually catching an image being displayed on the display. There is therefore no need to use an appliance such as a camera or personal computer. Thus color component adjustment is easy to implement.

The above described objects and other objects, features, aspects and advantages of the present invention will become more apparent from the following detailed description of the present invention when taken in conjunction with the accompanying drawings.

BEST FORM FOR PRACTICING THE INVENTION

Figure 1:
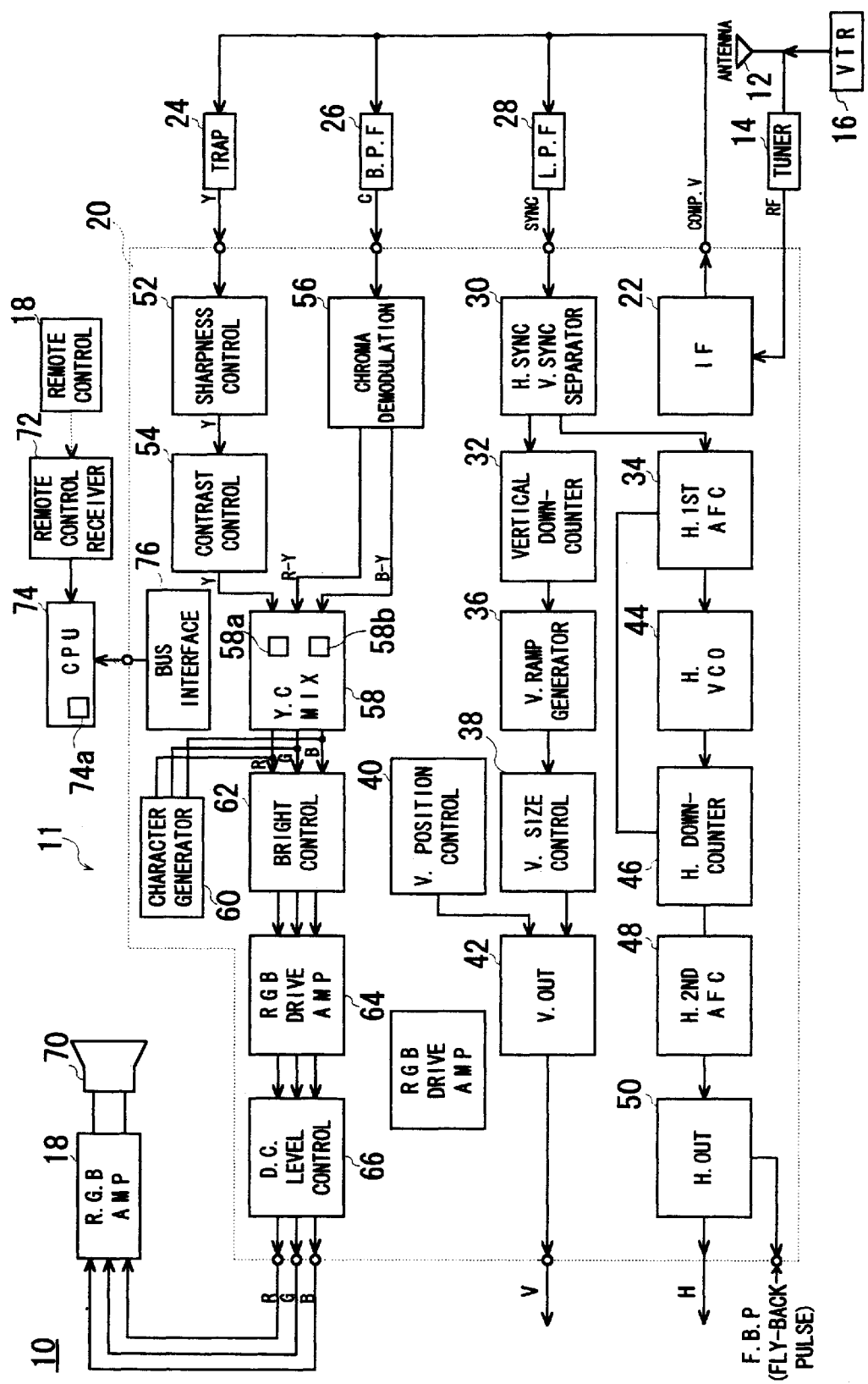
FIG. 1 is a block diagram showing one embodiment of the present invention.
Figure 2:
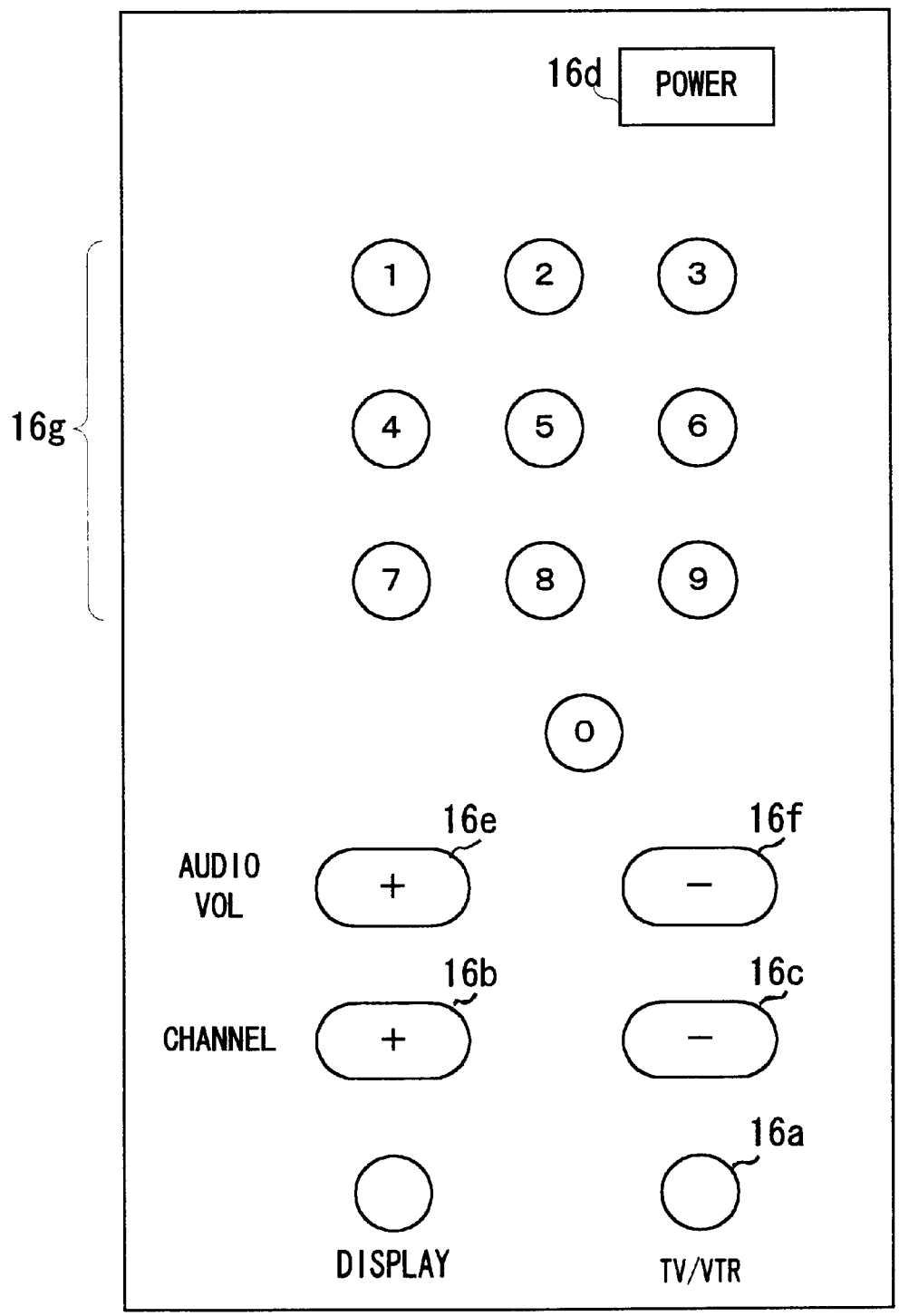
FIG. 2 is an illustrative view showing a remote control.

Referring to FIG. 1, a television system 10 of this embodiment includes a television receiver 11 and a remote control 18. The television receiver 11 is connected with an antenna 12. The antenna 12 receives a radio frequency signal to be delivered to a tuner 14 so that an intermediate frequency (IF) signal over a desired channel only is outputted from this tuner 14. The tuner 14 is to be also inputted by a radio frequency test signal for picture quality adjustment reproduced by a VTR 16. The tuner 14 selects a radio frequency signal over any of channels, according to an operation of an input switch key 16a provided on the remote control 18 shown in FIG. 2. An integrated circuit (IC) 20 is provided with an IF circuit 22 to create a composite video signal based on an IF signal sent from the tuner 14. The composite video signal is supplied to a trap circuit 24, band-pass filter (BPF) 26 and low-pass filter (LPF) 28. The trap circuit 24 detects a Y signal contained in a composite video signal. The BPF 26 detects a color signal. The LPF 28 detects a decoding synchronizing signal.

The IC 20 employs, for example, an IC "LA76070N" manufactured by Sanyo Electric Co., Ltd. This includes a synchronizing separator circuit 30 to receive a decoding synchronizing signal form the LPF 28 and supply a vertical synchronizing signal to a horizontal down-counter 32 and a horizontal synchronizing signal to a first AFC (Automatic Frequency Control) circuit 34. The vertical down-counter 32 decrements a count value depending upon a vertical synchronizing signal. A ramp waveform generating circuit 34 generates a ramp waveform signal, according to a count value of the vertical down-counter 32. The ramp waveform signal is delivered to a V-size control circuit 36 to control a V size, or amplitude, thereby determining an aspect ratio for an output video picture. Meanwhile, a V-position control circuit 40 outputs a direct current voltage signal to determine a position for starting vertical deflection. A vertical pulse output circuit 42 multiplexes this direct current voltage signal over an output of the V-size control circuit 38 thereby outputting to a deflection circuit (not shown) a vertical pulse having a ramp waveform component and direct current voltage component.

Incidentally, the ramp waveform generator 36 is turned on/off by the CPU 74. The V-position control circuit 40 outputs a direct current voltage signal dependent upon a control data given from the CPU 74. The V-size control circuit 38 makes V-size adjustment depending upon the control data given from the CPU 74.

On the other hand, the horizontal synchronizing signal controlled in frequency by the first AFC circuit 34 is supplied to a VCO circuit 44, thereby creating an oscillation frequency signal having a phase locked to the horizontal synchronizing signal. In accordance with this oscillation frequency signal, a horizontal down-counter 46 decrements its count value to be supplied to the first AFC circuit 34 and a second AFC circuit 48. The second AFC circuit 48 creates a pulse that rises at an interval of 1 H, based on a count value of the horizontal down counter 46 and a fly-back pulse given from a fly-back transformer (not shown). A horizontal pulse output circuit 50 outputs to a deflection circuit a horizontal pulse having a duty ratio of 50% based on this pulse. Incidentally, the horizontal pulse is adjusted in phase by controlling the second AFC circuit 48 by the CPU 74.

The trap circuit 24 supplies a brightness signal to be subjected to edge enhancement by a sharpness control circuit 52 and contrast adjustment by a contrast control circuit 54. On the other hand, a chroma demodulating circuit 56 demodulates a color signal given from the BPF 26 to thereby create chrominance signals R-Y and B-Y. A YC mixing circuit 58 mixes a brightness signal sent from the contrast control circuit 54 with chrominance signals R-Y and B-Y, thereby creating an RGB signal. The created RGB signal is superimposed over by a character signal sent from a character generator 60 so that a superimposed signal is controlled in brightness by a bright control circuit 62. An RGB drive amplifier 60 applies a gain to the brightness-adjusted RGB signal. Furthermore, the RGB signal from the RGB drive amplifier 64 is adjusted in bias level by a DC level control circuit 66. In this manner, the RGB signal adjusted in various points is delivered through an RGB amplifier 68 onto the display 70. Thus, videos having desired picture quality are outputted onto the display 70.

Incidentally, The CPU 74 controls the degree of edge enhancement of the sharpness control circuit 52, the brightness level control of the contrast control circuit 54, and the tint and hue of a chrominance signal demodulated by a chroma demodulation circuit 56. Also, the bright control circuit 62 controls the bright level according to control data given from the CPU 34. The RGB drive amplifier 64 controls an R gain (R drive) and G gain (G drive) according to control data given from the CPU 74. The DC level control circuit 66 controls R, G and B bias levels according to control data given from the CPU 74.

If an operator manipulates the remote control 18, a corresponding infrared ray signal is given to the remote control receiver 20 whereby it delivers data corresponding to the infrared ray signal to the CPU 74. The CPU 74 processes a flowchart shown in FIG. 3 and FIG. 4, supplying control data through a bus interface 76 to various circuits. This controls output video picture quality.

Figure 3:
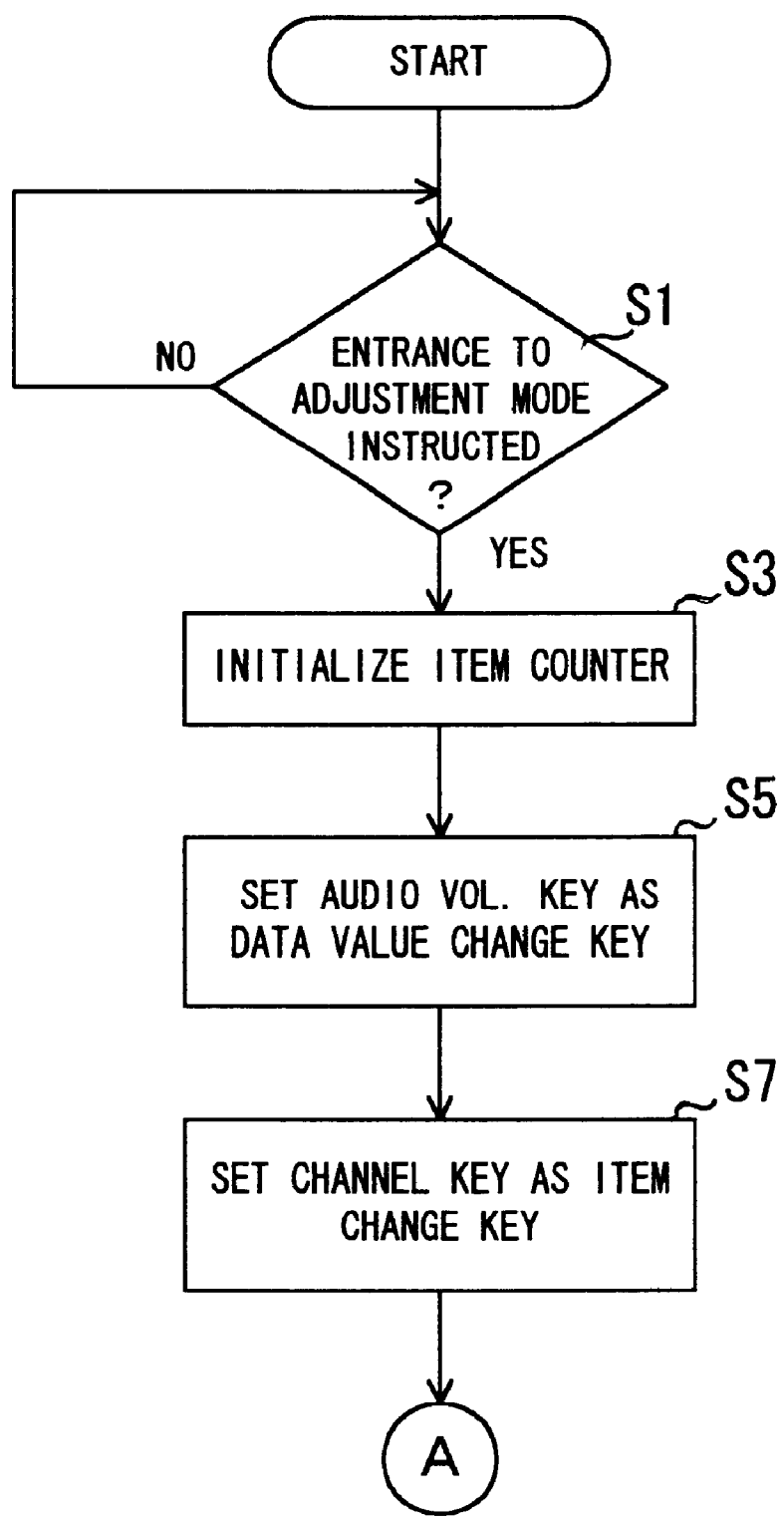
FIG. 3 is a flowchart showing one part of operation in the FIG. 1 embodiment.
Figure 4:
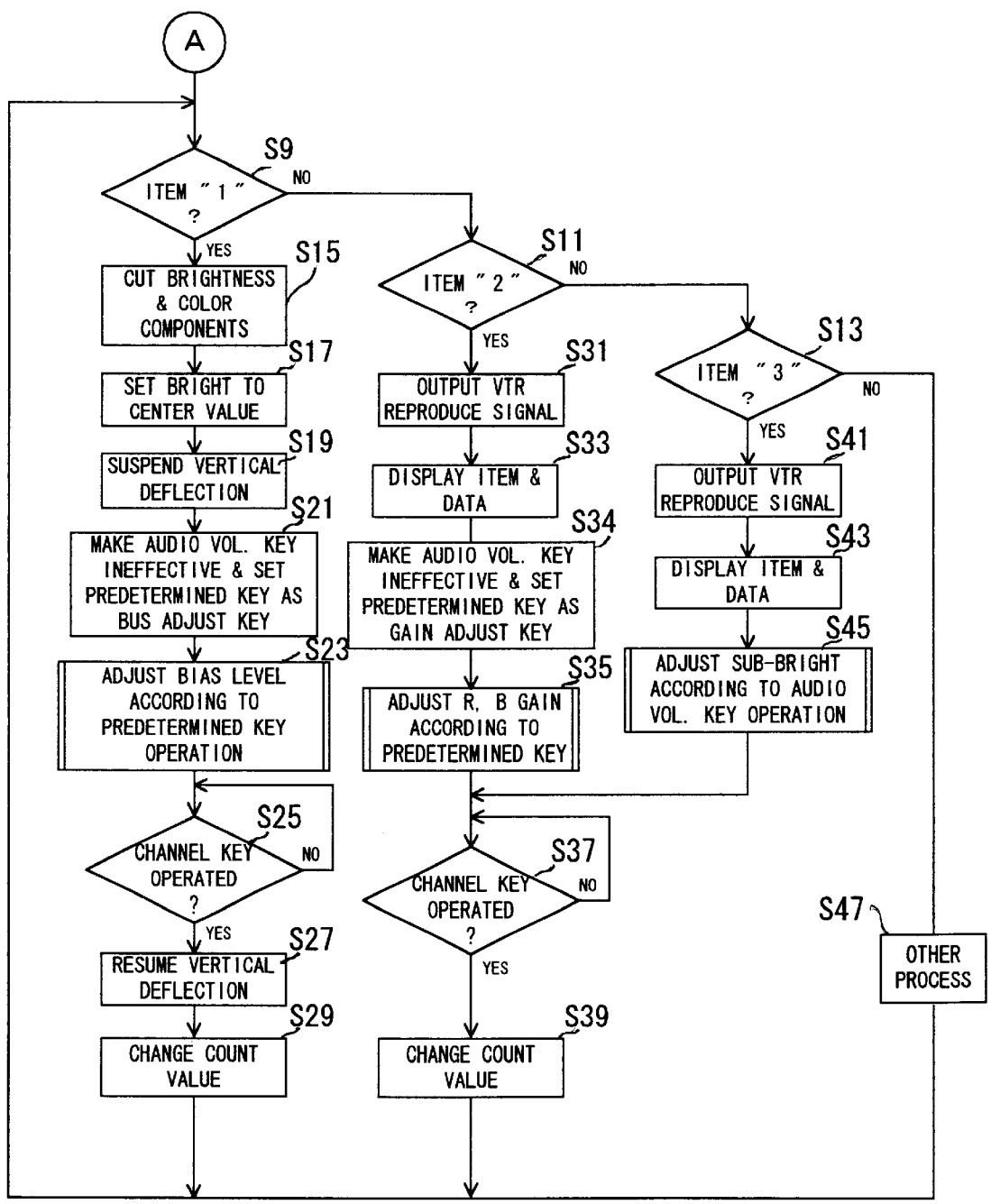
FIG. 4 is a flowchart showing another part of operation in the FIG. 1 embodiment.

The CPU 74 first determines in step S1 of FIG. 3 whether there was an entering instruction to an adjustment mode or not. When simultaneously pressing either of a channel up key 16b or a channel down key 16c on the remote control 18 and a power key 16d, the CPU determines that an entering instruction was made. In step S3 an item counter 76 which counts an item no. is initialized, i.e. set to "1". Subsequently, the CPU 74 in step S5 sets an audio volume up key 16e and audio volume down key 16f as data value change keys, and sets in step S7 a channel up key 16b and channel down key 16c as item change keys.

The CPU 74 then determines, in respective steps S9 to S13, whether the count value of the item counter 76, i.e. item no. is "1", "2" or "3". If the item no. is "1", an RGB bias level adjustment mode is entered. If the item no. is "2", an adjustment mode of white balance, or R gain and B gain, is entered. If the item no. is "3", a sub-bright adjustment mode is entered. If fallen under the other items, in step S45 a process is entered for other adjustment items. Incidentally, although sub-bright is meant basically same as bright, it is limited narrower in adjustment range than that of bright. It is referred to as sub-bright in order to distinguish between them.

In the RGB bias adjustment mode, the CPU 74 in step S15 enables a brightness component cutoff circuit 58a and color component cutoff circuit 58b included in the YC mixing circuit 58 to cut down brightness and color components. Furthermore, the CPU 74 in step S17 controls the bright control circuit 62 to set the bright level at a center value (reference value). Due to this, the R signal, B signal and G signal to be outputted from the bright control circuit 62 have respective waveforms having an amplitude always in a pedestal level except for a synchronizing signal, as shown in FIG. 5(A) to FIG. 5(C).

Figure 5:
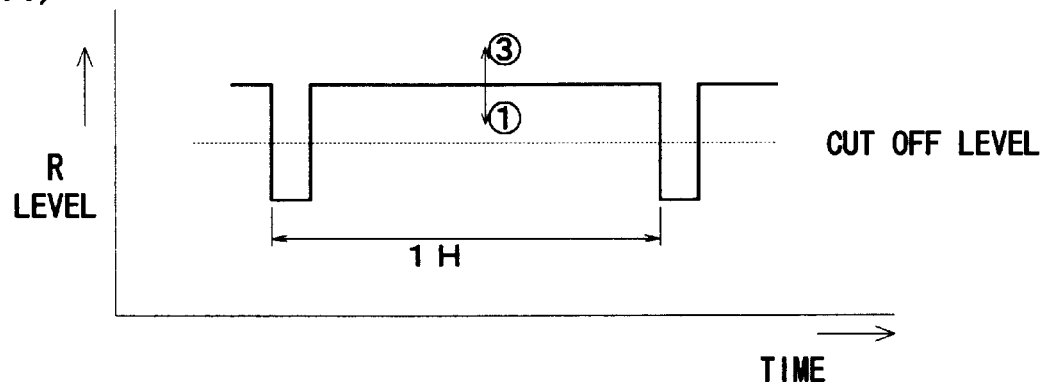
FIG. 5(A) is a waveform diagram showing an R signal, FIG. 5(B) a waveform diagram showing a G signal, and FIG. 5(C) a waveform diagram showing a B signal.
Figure 5:
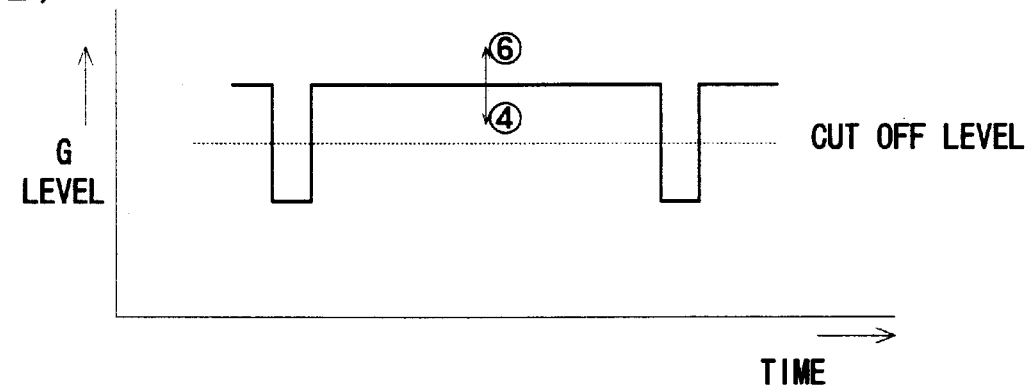
Figure 5:
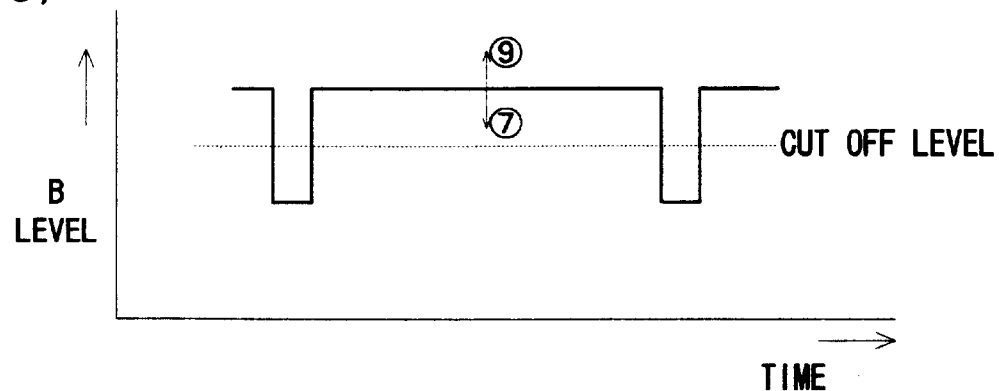
Figure 6:
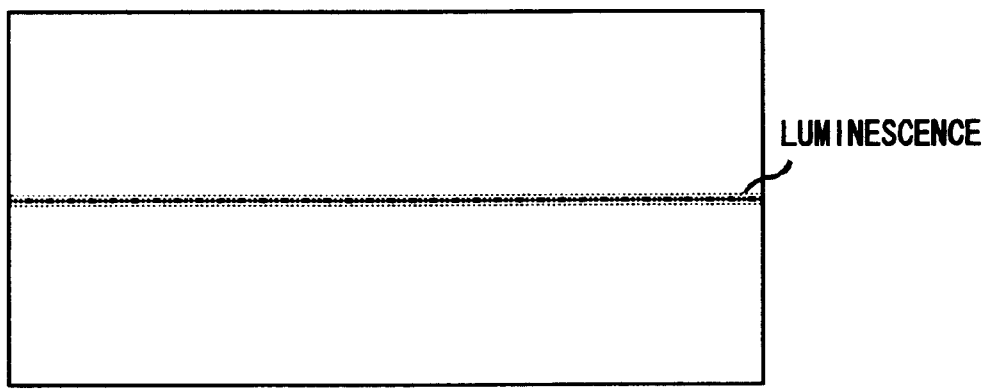
FIG. 6 is an illustrative view showing a horizontally-lined state on the display.

If the CPU 74 in step S19 suspends vertical deflection, i.e. disables the ramp waveform generator 36, the display 70 is brought into a horizontally-lined state wherein a whitish image is outputted horizontally at a vertically-centered position, as shown in FIG. 6. That is, if vertical deflection is being applied, a blackish image corresponding to an RGB signal is outputted onto the display 70, as shown in FIG. 5. However, if the vertical deflection is suspended, whitish luminescence occurs at vertically centered position on the display 70. If this light be reddish, it is to be determined that the R bias level is greater than the cutoff level. If the light be greenish, it is to be determined that the G bias level is higher than the cutoff level. If the light be bluish, it is to be determined the B bias level is greater than the cutoff level.

The CPU 74 in step S21 renders the audio volume up key 16e and audio volume down key 16f ineffective, to set the channel select keys 16g as RGB bias level adjustment keys. Specifically, the channel select key "1" is taken as an R bias level down key while the channel select key "3" is as an R bias level up key. Also, the channel select key "4" is taken as a G bias level down key while the channel select key "6" is as a G bias level up key. Furthermore, the channel select key "7" is taken as a B bias level down key while the channel select key "9" is as a B bias level up key. Consequently, the operator can manipulate channel select keys while observing a luminescent state on the display 70. Thus, the R bias level, G bias level and B bias level can be adjusted to a cutoff level.

The CPU 74 in step S23 controls the DC level control circuit 66 according to an operation of the channel select key. That is, the RGB bias level is adjusted. It is then determined in step S25 whether the channel up key 16b or channel down key 16c was operated or not. If "YES", in step S27 vertical deflection is resumed, and in step S29 the count value of the item counter 76 is changed according to the operation in the step A25, and the process returns to the step S9.

Figure 7:
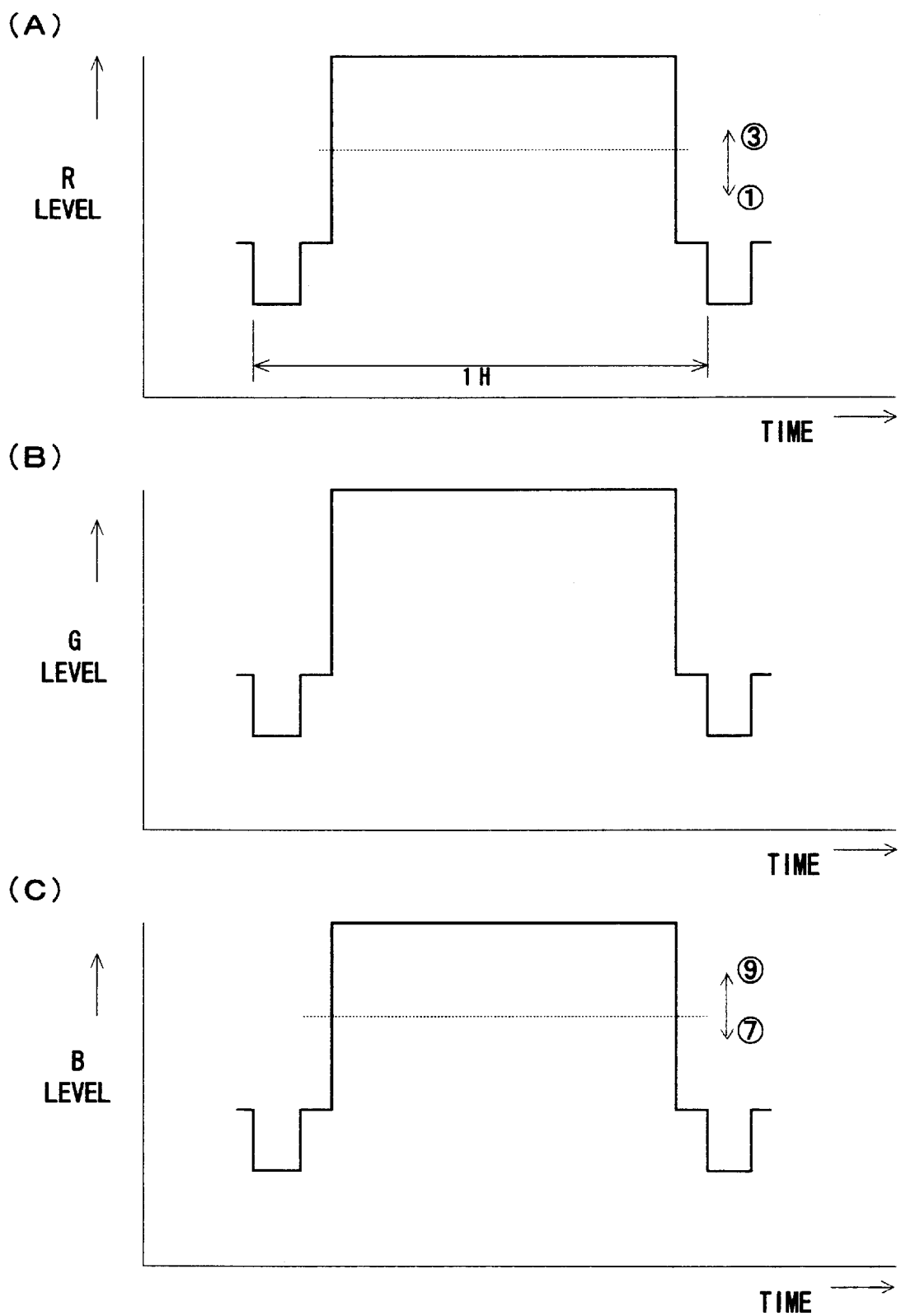
FIG. 7(A) is a waveform diagram showing an R signal, FIG. 7(B) waveform diagram showing a G signal, and FIG. 7(C) a waveform diagram showing a B signal.

In the white balance adjustment mode (gain adjustment mode), the CPU outputs in step S31 a VTR reproduce signal from the display 70. At this time, the operator is required to set a predetermined video cassette previously prepared on the VTR 16. Thereupon, the bright control circuit 62 outputs a signal that is all white in R level, G level and B level, as shown in FIG. 7(A) to FIG. 7(C).

Figure 8:
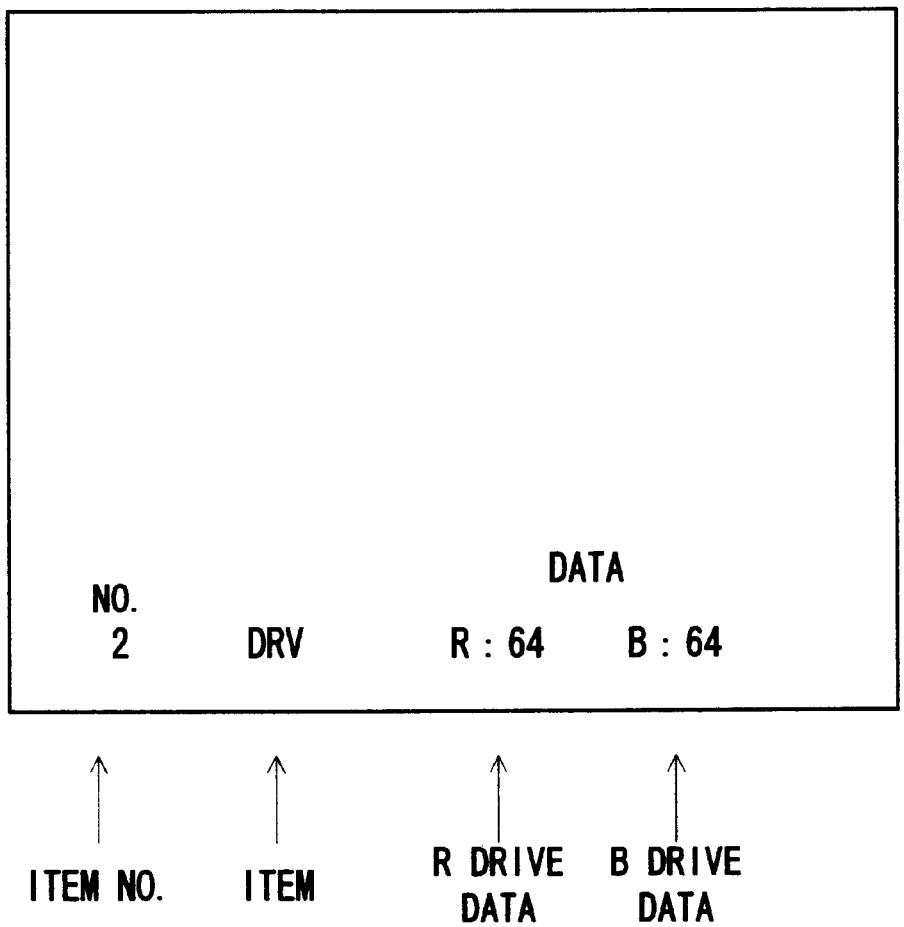
FIG. 8 is an illustrative view showing one example of an output of a display 70.

Thereafter, the CPU 74 in step S33 controls the character generator 60 whereby item no. "2", item DRV indicative of a drive, R drive data and B drive data are displayed on the display 70, as shown in FIG. 8. The CPU 74 in step S34 renders ineffective the volume up key 16e and volume down key 16f, and sets the channel select keys 16g as a gain adjust key. Accordingly, if the operator manipulates any of the channel select keys, the CPU 74 in step S75 adjusts the R gain and B gain according to the operation.

Specifically, to operate the channel select key "1" cause decreases in the R gain while to operate the channel select key "3" cause increases in the R gain. Also, to operate the channel select key "7" lowers the B gain while to operate the channel select key "9" increases the B gain. If the video displayed on the display 70 is reddish, it is possible to eliminate redness by operator's operation of the channel select key "1". If it is bluish, blueness can be removed by operator's operation of the channel select key "7". Incidentally, adjustment of white balance may require adjustment of at least two among the R gain, G gain and B gain. The two are not limited to the R gain and B gain.

The CPU 74 determines in step S37 whether the channel up key 16b or channel down key 16c was operated or not. If "YES", in step S39 the item counter 76 is changed according to that operation, and the process returns to the step S9.

Figure 9:
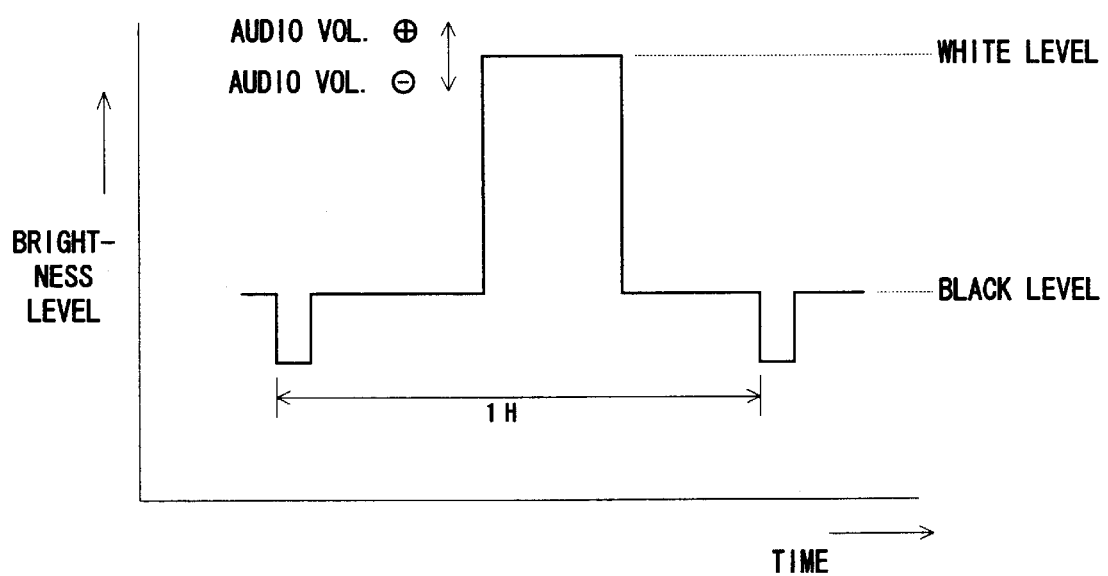
FIG. 9 is a waveform diagram showing a brightness level.
Figure 10:
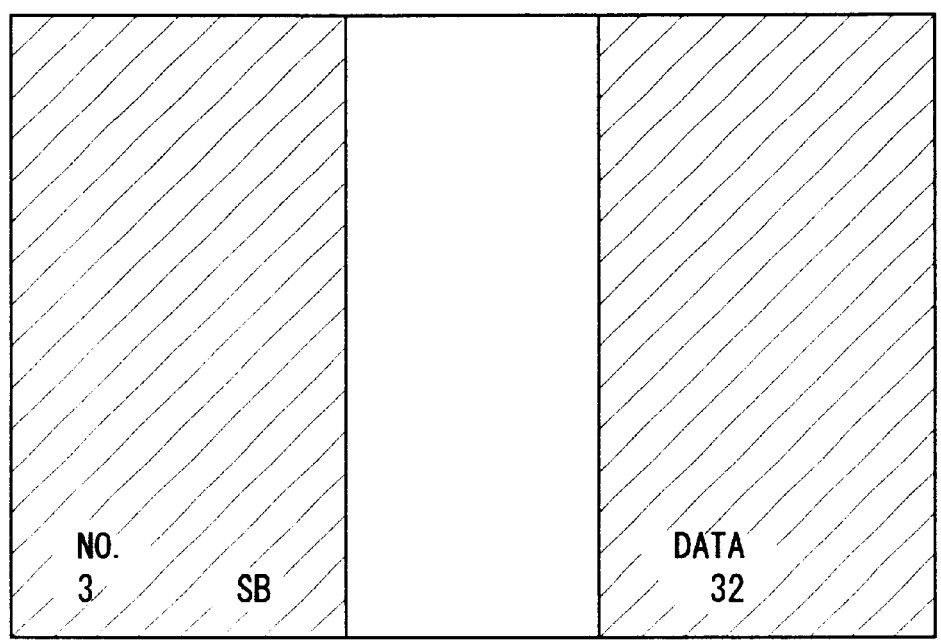
FIG. 10 is an illustrative view showing another example of an output of the display.
Figure 11:
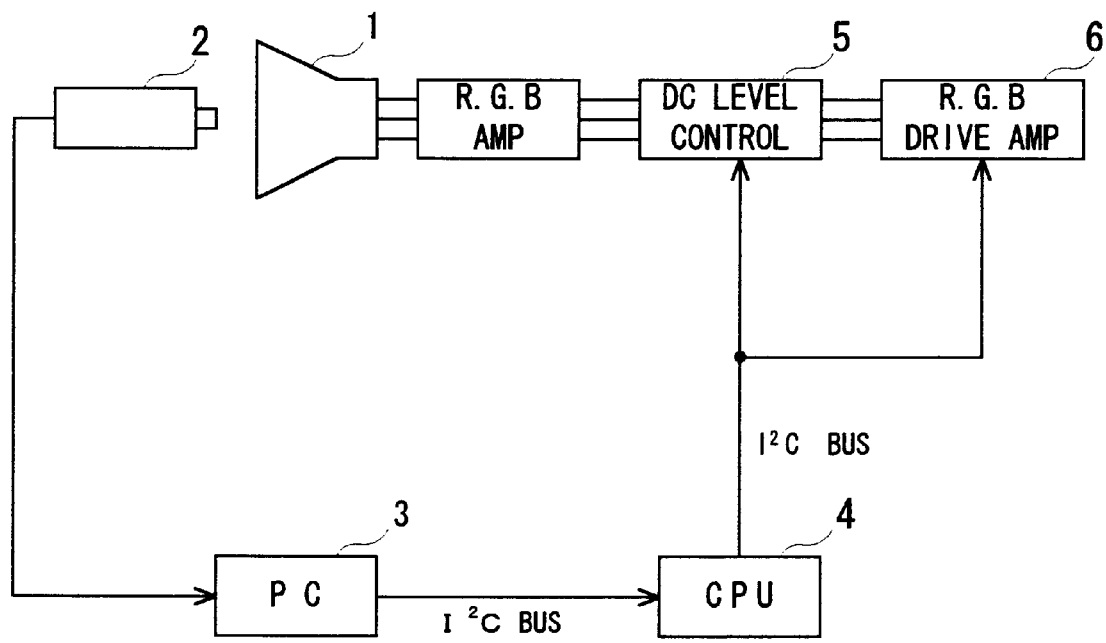
FIG. 11 is a block diagram showing an prior art.

In the sub-bright adjustment mode, the CPU 74 in step S41 outputs a VTR reproduce signal to the display 70. At this time, the operator is required to set on the VTR 16 a video cassette recorded with a window pattern signal. Thereupon, the contrast control circuit 54 outputs a brightness signal having a brightness level that rises at a center in a 1 H period in a pulse form, as shown in FIG. 9. On the display 70 is displayed a window pattern that is black at left and right and white at the center, as shown in FIG. 10. The processing of step S43 by the CPU 74 provides display of item no. "3", item SB indicative of sub-bright and data on the display 72, simultaneously with the window pattern. If the operator observes this window pattern and manipulates the audio volume up key 16e, the CPU 74 in step S45 increases the brightness level at the screen center. If the operator operates the sound volume down key 16f, the CPU 74 in step S45 decreases the brightness level at the screen center. Thereafter, the CPU 74 proceeds the process to step S37 to carry out the same process as above.

According to this embodiment, the keys arranged on the remote control 18 are set as picture quality adjust keys and the display 70 displays a picture to be utilized for picture quality adjustment. It is therefore possible to readily adjust picture quality without using an appliance such as a camera or personal computer.

Incidentally, where applying this embodiment for picture quality adjustment in a manufacture process, rough adjustment of picture quality is possible by taking a data step width of, for example, "3" for each key depression. Where complete product having being rough adjusted is adjusted of picture quality at a shipment destination, it is possible to accurately adjust picture quality by taking "1" the data step width for each key depression. In this connection, in the manufacture process rough image quality adjustment is implemented by an operator with chasses amounted with IC 20 are connected to a common display 70.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A television system including a remote control and a television receiver that receives a key operation signal supplied from said remote control, comprising:

a mode set means for setting said television receiver in an adjustment mode; and a color component adjust means for adjusting, in a color component adjusting mode, a color component according to a key operation signal given from said remote control;

wherein said remote control includes a plurality of channel select buttons, and said color component adjusting means directly adjusting the color component in response to at least one of operations of said channel select buttons.

2. A television system according to claim 1, wherein said mode set means is to set said television receiver in a bias adjusting mode, and said color component adjust means including a bias level adjusting means to adjust an RGB bias level according to a key operation signal from said remote control.

3. A television system according to claim 2, further comprising a suspension means to suspend vertical deflection when a bias adjustment mode is set.

4. A television system according to any of claims 1 to 3, further comprising:

a bright control means for receiving an RGB signal and adjusting a bright level;

an YC mixing means for receiving a video signal and providing the RGB signal to said bright control means; and a removing means for removing brightness and color components from the video signal to be supplied to said YC mixing means in a bias adjustment mode.

5. A television system according to claim 4, further comprising a set means to set the bright level to a reference value.

6. A television system according to claim 1, wherein said mode set means sets said television receiver in a gain adjustment mode, and said color component adjust means including a gain adjusting means to adjust at least two gains of R, G and B according to a key operation signal given from said remote control.

7. A television system according to claim 6, further comprising a signal input means to input a test signal to the television system from outside the television system to adjust the gain.

* * * * *